United States Patent
Nieto et al.

(10) Patent No.: US 8,213,402 B2
(45) Date of Patent: Jul. 3, 2012

(54) AUTOMATIC REPEAT REQUEST (ARQ) COMMUNICATION SYSTEM USING PHYSICAL LAYER MONITORING

(75) Inventors: John W. Nieto, Rochester, NY (US); William N. Furman, Fairport, NY (US); Michael A. Wadsworth, Palmyra, NY (US)

(73) Assignee: Harris Corporation, Melbourne, FL (US)

( * ) Notice: Subject to any disclaimer, the term of this patent is extended or adjusted under 35 U.S.C. 154(b) by 1373 days.

(21) Appl. No.: 11/676,703

(22) Filed: Feb. 20, 2007

(65) Prior Publication Data
US 2008/0198786 A1 Aug. 21, 2008

(51) Int. Cl.
*H04J 3/24* (2006.01)

(52) U.S. Cl. ........ 370/349; 370/338; 370/401; 370/393; 370/389; 455/435.1; 455/445; 455/403; 455/422.1; 455/428

(58) Field of Classification Search ................... 370/349, 370/469
See application file for complete search history.

(56) References Cited

U.S. PATENT DOCUMENTS

| | | | |
|---|---|---|---|
| 6,760,860 B1 | 7/2004 | Fong et al. .................. 714/4 |
| 6,907,270 B1 * | 6/2005 | Blanz .................. 455/562.1 |
| 7,000,021 B1 | 2/2006 | Radhakrishnan et al. .... 709/230 |
| 7,007,218 B2 | 2/2006 | Chamberlain ................. 714/748 |
| 7,085,539 B2 | 8/2006 | Furman ...................... 455/67.13 |
| 7,089,478 B2 * | 8/2006 | Cummings et al. ............ 714/755 |
| 7,130,295 B2 * | 10/2006 | Kim et al. ...................... 370/349 |
| 7,149,192 B2 | 12/2006 | Kwak ............................ 370/320 |
| 7,149,193 B2 | 12/2006 | Fong et al. .................... 370/328 |
| 2002/0080886 A1 * | 6/2002 | Ptasinski et al. ............... 375/295 |
| 2003/0072286 A1 | 4/2003 | Kim et al. ...................... 370/335 |
| 2003/0097623 A1 | 5/2003 | Razavilar et al. ............. 714/704 |
| 2003/0120990 A1 | 6/2003 | Elbwart et al. ................. 714/748 |
| 2003/0177429 A1 | 9/2003 | Hessel et al. .................. 714/751 |
| 2005/0094632 A1 | 5/2005 | Hebsgaard et al. ........... 370/389 |
| 2005/0195822 A1 | 9/2005 | Lim et al. ...................... 370/393 |
| 2005/0249133 A1 | 11/2005 | Terry et al. .................... 370/278 |
| 2005/0276345 A1 | 12/2005 | Norris et al. .................. 375/265 |
| 2006/0243762 A1 | 11/2006 | Terry et al. .................... 370/328 |
| 2007/0081513 A1 * | 4/2007 | Torsner ........................ 370/349 |
| 2007/0211624 A1 * | 9/2007 | Schmidt et al. ............... 370/225 |

* cited by examiner

*Primary Examiner* — Charles Appiah
*Assistant Examiner* — Randy Peaches
(74) *Attorney, Agent, or Firm* — Allen, Dyer, Doppelt, Milbrath & Gilchrist, P.A.

(57) ABSTRACT

A communication system includes a plurality of nodes forming a wireless mesh network. A plurality of wireless communication links connect the nodes together. Each node is formed as a communications device having a physical layer and a media access control (MAC) layer in accordance with the Open System Interconnect (OSI) model and operative for transmitting and receiving communications packets to and from other nodes via the wireless communication links in an Automatic Repeat Request (ARQ) mode. The physical layer monitors channel parameters of the wireless communications link when in an ARQ mode and, based on the channel parameters, communicates to the MAC layer over-the-air (OTA) parameters used for transmitting packets.

17 Claims, 3 Drawing Sheets

AUTOMATIC REPEAT REQUEST (ARQ) COMMUNICATION SYSTEM USING PHYSICAL LAYER MONITORING

FIELD OF THE INVENTION

The present invention relates to communication systems, and more particularly, the present invention relates to communication systems using an automatic repeat request (ARQ) protocol.

BACKGROUND OF THE INVENTION

Automatic Repeat Request (ARQ) is a communications protocol that provides error control in data transmissions. A receiver detects an error in a packet and automatically requests a transmitter to resend the packet. The process is repeated until the packet is error free or in some cases, the process is terminated repeated if the error continues beyond a predetermined number of transmissions. The phrase "admission request" is also used to describe this type of protocol, and refers to the requests to resend corrupted data. Various types of messages associated with an admission request include an Admission Request, an Admission Request Confirmed (ARC), an Admission Request Reject (ARJ) or other similar bandwidth requests that confirm and/or reject messages.

In this type of system, a positive acknowledgment (ACK) can be returned when data is received correctly, and a negative acknowledgment (NAK) can be returned when the error is detected. Different types of automatic repeat requests can occur, including a stop-and-wait, go-back-N, and selective-reject.

There are different types of ARQ schemes, commonly known as Type I, Type II, and Type III. In Type I, erroneous received packets are discarded and a new copy of the same packet is retransmitted and decoded separately. There is no combining of earlier and later received versions. In Type II, any erroneous received packets are not discarded, but are combined with additional retransmissions for subsequent decoding. In Type III, each transmitted packet is self-decodable without combining with previous packets.

It is also possible to reuse the redundancy of previously transmitted packets by soft-combining, co-combining, and implementing a combination of soft-combining and co-combining. Co-combining links receive packets to generate a new code word. A decoder combines the transmissions at each retransmission instant to perform a correct decoding when the code rate depends on retransmission. In a combination of soft-combining and co-combining, retransmitted packets carry some symbols/bits identical to previously transmitted symbols/bits, while some co-symbols/bits are different from these. Other examples of ARQ systems are found in U.S. published patent application nos. 2003/0097623; 2003/0120990; and 2003/0072286, and U.S. Pat. No. 7,149,192.

Automatic repeat requests are often used in high frequency radio communications, including "short wave" radio communications between about 3 and 30 MHz, and in much higher frequency radio communications in the gigahertz range. The ARQ protocol is often used in multi-band tactical radio systems to provide reliable tactical communications for secure voice and data transmission and networking capability. For example some advanced high frequency/very high frequency/ultra high frequency (HF/VHF/UHF) radio systems have high speed data rates up to about 9,600 Bps (HF) or more and selectable ARQ modes for reduced on-the-air transmission time, while also providing enhanced and more secure data transmissions to improve communications. Some of these systems include a serial tone data modem that can operate over poor communication channels. For example, the growth of high frequency (HF) networking throughout the 1980's and mid-1990's required a more efficient protocol such that the limited HF spectrum would support larger networks and greater amounts of data traffic.

Third-generation communications protocols have now become established and include NATO STANAG-4538, the disclosure which is hereby incorporated by reference in its entirety. Third-generation improvements include higher data throughput, automatic link establishment (ALE), increased channel capacity, quicker link establishment, and improved signal-to-noise ratio (SNR). Various systems in a third-generation ALE include the use of linking with data transfer protocol units, burst PSK waveforms, multi-channel access, and Carrier Sense Multi-Access with Collision Avoidance (CSMA/CA) channel access procedures. Any software used by radios and base stations typically connect to an Ethernet-PCP/IP local area network, in which a radio could operate as a "radio" and mail server and allow delivery of e-mail and files across multiple transmission media including any HF/VHF/UHF radio, LAN, landline, microwave, or satellite systems. Such systems could form a wireless gateway with wireless message terminals.

In radios using an ARQ protocol, the physical layer and MAC layer communicate with each other. Most ARQ schemes are developed with no physical layer knowledge. When a physical layer is added to an ARQ system, a training period is required where ARQ develops a set of tables to use for data rate adaptation based on some information derived from the physical layer. The signal-to-noise ratio is a value commonly used, as well as use of the packet error rate (PER). This approach has some limitations because the signal-to-noise ratio and packet error rate are not sufficient to characterize a link. If the physical layer changes, some training has to be accomplished again.

Some prior art proposals, as used with STANAG 5066 Standards, use the packet error rate and signal-to-noise ratio to aid in the data rate/interleaver length adaptation process. Although these have been found sufficient for some applications, again training has to be accomplished if the physical layer changes. Additionally these trained adaptation rules will need to be reconfigured for each specific (vendor) implementation of the standard.

SUMMARY OF THE INVENTION

A communication system includes a plurality of nodes forming a wireless mesh network. A plurality of wireless communication links connect the nodes together. Each node is formed as a communications device having a physical layer and a media access control (MAC) layer in accordance with the Open System Interconnect (OSI) model and operative for transmitting and receiving communications packets to and from other nodes via the wireless communication links in an Automatic Repeat Request (ARQ) mode. The physical layer (PHY) monitors channel parameters of the wireless communications link when in an ARQ mode and, based on the channel parameters, communicates to the MAC layer over-the-air (OTA) parameters used for transmitting packets.

The OTA parameters can be formed of one of at least the bandwidth, data rate, transmit power, block size, burst size (i.e., length of transmission) and waveform (i.e. where waveform is waveform type such as single-carrier, orthogonal frequency division multiplexing (OFDM), spread spectrum, frequency hopping, per symbol modulation, etc). The monitored channel parameters are typically one of at least multipath, fading, signal-to-noise radio, receive signal strength (RSS), bit error rate, packet error rate, and interference level.

In yet another aspect, the MAC layer includes an ARQ circuit that adds ARQ headers to communications packets at the communications device. This ARQ circuit can provide a positive or negative acknowledgment based on received communications packets. The MAC or PHY layer can also include a forward error correction (FEC) encoder that encodes communications packets generated at the communications device with a forward error correction code. The MAC or PHY layer includes a FEC decoder that decodes received packets.

In yet another aspect, the physical layer includes a channel monitoring circuit that monitors the channel parameters and a processor that determines what OTA parameters should be changed. The channel monitoring circuit and processor implements an interface to the MAC layer communicating the OTA parameters to the MAC.

An apparatus formed as a wireless transceiver includes the physical layer and media access control layer. The channel monitoring circuit and processor are at the physical layer.

A method aspect is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

In accordance with a non-limiting example of the present invention, some mobile radios such as designed by Harris Corporation of Melbourne, Fla. have a wideband networking capability and several different adaptation targets in its automatic repeat request (ARQ) mode, for example, the data rate, the transmit power, the bandwidth, block size, and associated factors. It is desirable to take advantage of the information available at the receiver of such radius and use the information for adapting data rates, bandwidths, transmit power, block sizes and associated factors.

In accordance with a non-limiting example of the present invention, the physical layer recommends to the media access control (MAC) layer the best choice of one of at least the bandwidth, data rate, transmit power block size, burst length and waveform type for each particular node in the network. This recommendation permits a more effective adaptation. Nodes are formed as wireless, mobile or fixed nodes, typically as transceivers that can operate in an ARQ mode. The physical layer can monitor and estimate the amount of multipath, fading, signal-to-noise ratio, received signal strength (RSS), bit error rate, packet error rate and interference level, and selects the best over-the-air (OTA) parameters available to work in the environment. These OTA parameters could include one of at least the bandwidth, data rate, transmit power, block size, burst length and waveform. As a result, the MAC layer is now independent of the physical layer and includes a redefined interface. Another physical layer can provide recommendations and be used in its place with no changes required at the MAC layer.

Figure 1:
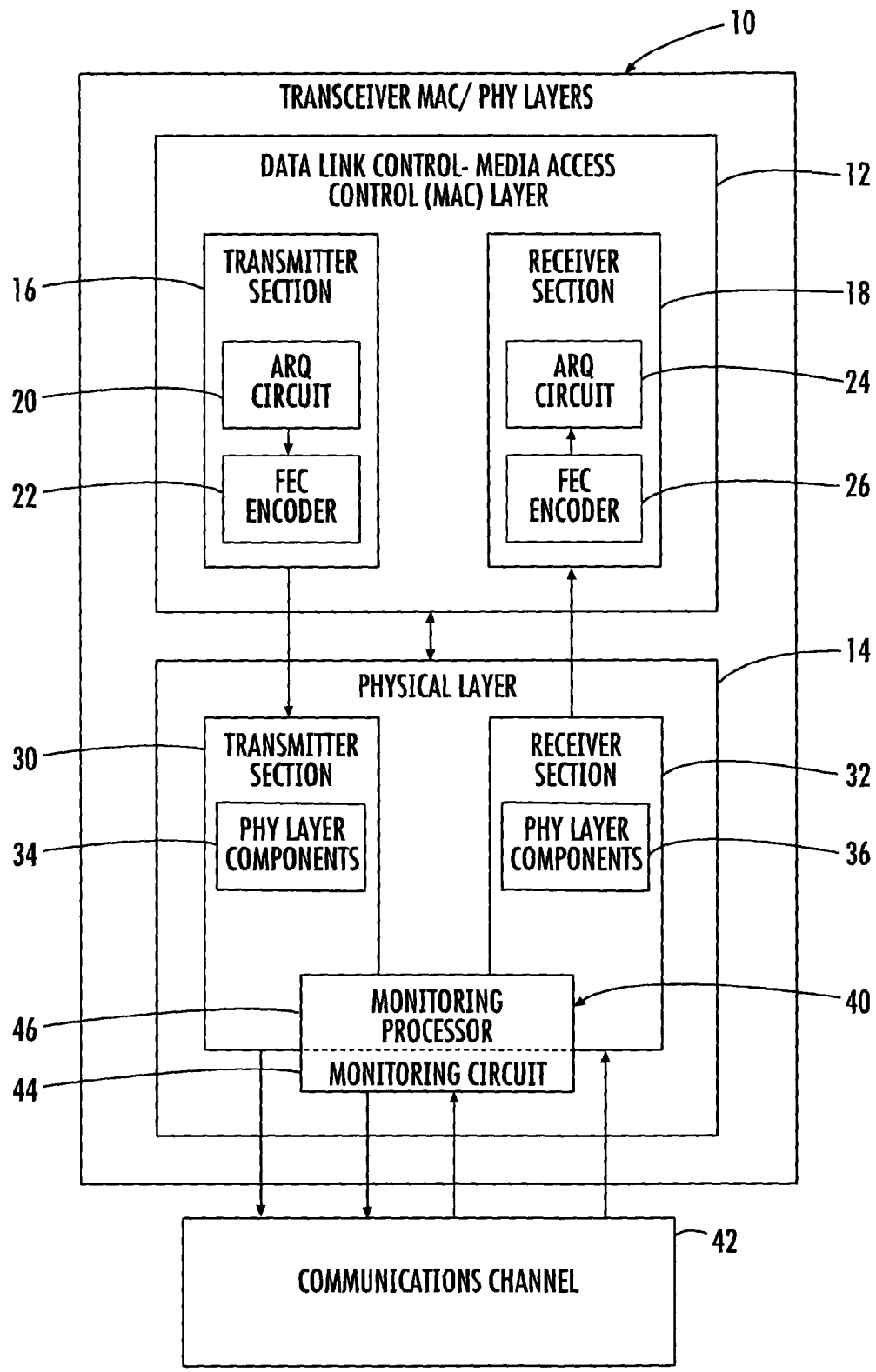
FIG. 1 is a block diagram showing a portion of a communications transceiver having a media access control (MAC) layer and physical layer (PHY), which includes the monitoring circuit and processor that passes OTA parameters up to the MAC layer in accordance with a non-limiting example of the present invention.

FIG. 1 is a high-level block diagram of a portion of a transceiver 10 as part of a communications system. The data link control layer, and more particularly, the media access control (MAC) layer 12 communicates with the physical layer 14. The MAC layer 14 includes a transmitter section 16, receiver section 18, an ARQ circuit 20 and FEC encoder 22 at the transmitter section 16 and an ARQ circuit 24 and FEC decoder 26 at the receiver section 18.

The physical layer 14 includes a transmitter section 30 and receiver section 32, each including respective physical layer components and circuits 34, 36 as known to those skilled in the art. The physical layer 14 also includes a channel-monitoring module 40 that monitors the channel parameters at the communications channel 42. The monitoring module 40 includes a monitoring circuit 44 and a processor 46 that determines what OTA parameters should be changed. The processor 46 communicates the new OTA parameters to the MAC layer 12.

Commonly assigned U.S. Pat. No. 7,085,539, the disclosure which is hereby incorporated by reference in its entirety, is an example of a system and method that can characterize a communications channel with respect to signal-to-noise ratio (SNR), time dispersion or multi-path, and frequency dispersion or Doppler spread. A probe signal modulator can receive a probe signal transmitted on a wireless communication channel and generate a demodulated probe signal. A probe signal remodulator can generate a replica probe signal. A delay unit can generate a delayed probe signal and an adaptive canceller can receive the delayed probe signal and generate a residual noise signal and channel characterization signal. A channel characterization block can receive the channel characterization signal and the residual noise signal to generate channel measurements of the wireless communication channel.

The ARQ circuit 20 adds ARQ headers to a communications packet and can provide a positive or negative acknowledgement based on received communications packets. The FEC encoder 22 encodes communication packets generated through the communications transceiver 10 with a forward error correction code. The monitoring module 40 can have functions implemented in software, hardware and/or firmware. Basic components known to those skilled in the art can be used.

As noted before, the MAC layer 12 and physical layer 14 each include respective transmitter 16, 30 and receiver sections 18, 32. The ARQ circuit 20 and FEC encoder 22 are operative at the transmitter section 16 and the ARQ circuit 24 and the FEC decoder 26 are operative at the receiver section 18. The physical layer 14 and MAC layer 12 can both include other circuits and components for function even though not illustrated in detail.

Figure 2:
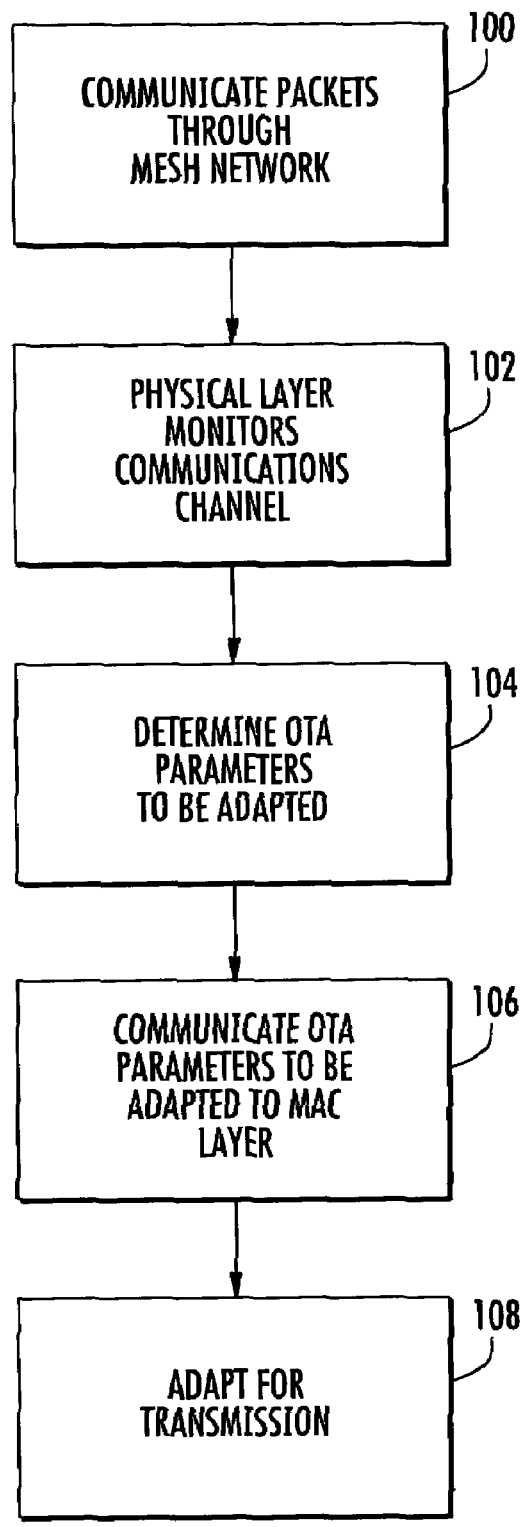
FIG. 2 is a high-level flowchart of a process that can be used in accordance with a non-limiting example of the present invention the present invention.

FIG. 2 illustrates a high-level flowchart showing a basic method that can be used in accordance with a non-limiting example of the present invention. As illustrated, a communications packet is initially transmitted wirelessly from a transceiver to a destination node using an ARQ protocol (block 100). This transceiver includes the physical layer and media access control (MAC) layer. The physical layer monitors the communications channel that exists between the transceiver and destination node when the transceiver is in an ARQ mode (block 102). Based on conditions at the monitored channel, the processor determines what OTA parameters should be changed/adapted (block 104). Over-the-air (OTA) parameters are communicated from the physical layer to the MAC layer based on monitored channel parameters (block 106). The transceiver OTA parameters are adapted (block 108).

It should be understood that the MAC layer is a sublayer as part of the data link layer and is typically below the logical link control (LLC) sublayer. The data link layer is layer two of the seven-layer OSI model and the five-layer TCP/IP reference model. Service requests are produced from the network layer and the data link layer responds and issues service requests to the physical layer. Thus, data is transferred between adjacent network nodes in a wide area network or between nodes of a local area network segment. Ethernet, PPP, HDLC and ADCCP are examples of data link protocols.

In many networks, for example, IEEE 802 local area networks, the data link layer is split into MAC and LLC sublayers. For purposes of description, the MAC layer as described can encompass different functions of the data link layer. The logical link control as an upper sublayer typically multiplexes protocols on top of the data link layer. The media access control (MAC) sublayer determines what data is allowed access media and can refer to a frame structure with MAC addresses. The MAC layer can be distributed and centralized. Thus, it provides some addressing of channel access control mechanisms and interfaces between the logical link control sublayer and the physical layer. The MAC layer also provides an addressing mechanism as a physical address or MAC address as a unique serial number assigned to each network adapter. As a result, data packets can be delivered to a destination within a subnetwork as a physical network without routers, for example, an Ethernet network. The MAC layer provides the protocol and control mechanisms required for channel access. As a result, different stations can connect to one physical medium.

The physical layer (PHY) is level one in the OSI model and the TCP/IP reference model. It transmits the information bits over the physical data link connecting network nodes. Packet headers and trailers are typically not added to the data by the physical layer (but forward error correction, interleaving, etc can be added by PHY). The bit stream can be grouped as a code word or symbol and converted to a physical signal that is transmitted over physical transmission media and provide an interface. Thus, the physical layer specifies different connectors, frequencies, modulation schemes and other low-level items, determines the channel capacity, digital bandwidth, maximum throughput and connection speed.

Other layers include the network layer as layer 3, the transport layer as layer 4, the session layer as layer 5, the presentation layer as layer 6, and the application layer as layer 7.

For purposes of description and as representative non-limiting examples, examples of network components that can be used as the second, data link layer include bridges, switches, ISDN routers, intelligent hubs, NIC's, advanced cable testers and other similar components and devices. Example protocols for layer 2 include logical link control with error correction and flow control that controls and manages SAP's, the 802 OSI model, the 802.2 logical link control, the media access control that communicates with an adapter card and controls the type of media and includes 802.3 CSMA/CD as Ethernet, 802.4 as token bus (ARC NET), 802.5 token ring and 802.12 demand priority.

As to the physical layer, components could include a repeater, multiplexer, active and passive hubs, a TDR, an oscilloscope, amplifier and similar components and devices. The protocols include IEEE 802, 802.2, ISO 2110, and ISDN.

Figure 3:
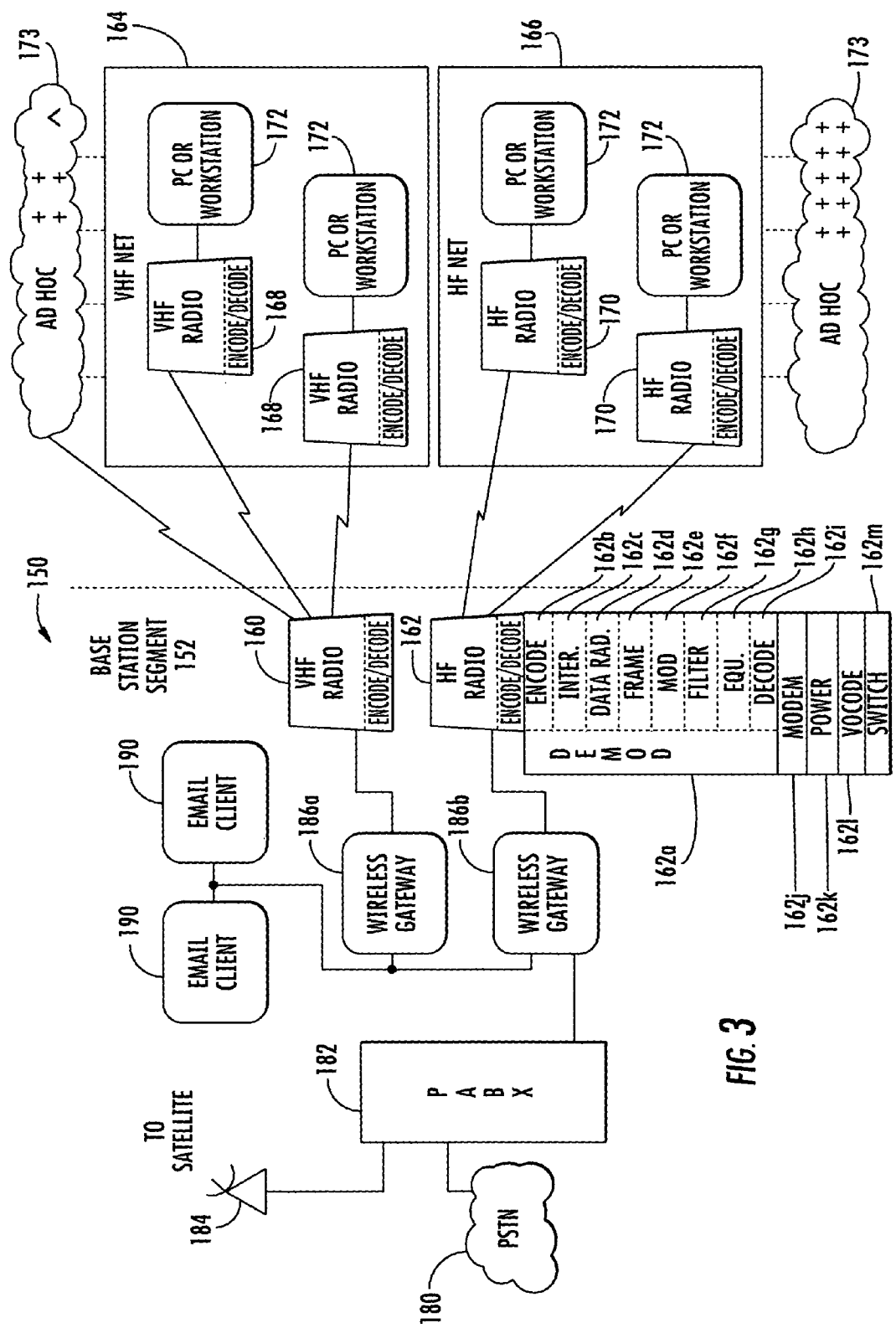
FIG. 3 is a block diagram of an example of a communications system that can be modified for use in accordance with a non-limiting example of the present invention.

An example of a communications system that can be modified for use with the present invention is now set forth with regard to FIG. 3.

An example of a radio that could be used with such system and method is a Falcon™ III radio manufactured and sold by Harris Corporation of Melbourne, Fla. It can include a basic transmit switch, and other functional switches and controls known to those skilled in the art. It should be understood that different radios can be used, including but not limited to software defined radios that can be typically implemented with relatively standard processor and hardware components. One particular class of software radio is the Joint Tactical Radio (JTR), which includes relatively standard radio and processing hardware along with any appropriate waveform software modules to implement the communication waveforms a radio will use. JTR radios also use operating system software that conforms with the software communications architecture (SCA) specification (see www.jtrs.saalt.mil), which is hereby incorporated by reference in its entirety. The SCA is an open architecture framework that specifies how hardware and software components are to interoperate so that different manufacturers and developers can readily integrate the respective components into a single device.

The Joint Tactical Radio System (JTRS) Software Component Architecture (SCA) defines a set of interfaces and protocols, often based on the Common Object Request Broker Architecture (CORBA), for implementing a Software Defined Radio (SDR). In part, JTRS and its SCA are used with a family of software re-programmable radios. As such, the SCA is a specific set of rules, methods, and design criteria for implementing software re-programmable digital radios.

The JTRS SCA specification is published by the JTRS Joint Program Office (JPO). The JTRS SCA has been structured to provide for portability of applications software between different JTRS SCA implementations, leverage commercial standards to reduce development cost, reduce development time of new waveforms through the ability to reuse design modules, and build on evolving commercial frameworks and architectures.

The JTRS SCA is not a system specification, as it is intended to be implementation independent, but a set of rules that constrain the design of systems to achieve desired JTRS objectives. The software framework of the JTRS SCA defines the Operating Environment (OE) and specifies the services and interfaces that applications use from that environment. The SCA OE comprises a Core Framework (CF), a CORBA middleware, and an Operating System (OS) based on the Portable Operating System Interface (POSIX) with associated board support packages. The JTRS SCA also provides a building block structure (defined in the API Supplement) for defining application programming interfaces (APIs) between application software components.

The JTRS SCA Core Framework (CF) is an architectural concept defining the essential, "core" set of open software Interfaces and Profiles that provide for the deployment, management, interconnection, and intercommunication of software application components in embedded, distributed-computing communication systems. Interfaces may be defined in the JTRS SCA Specification. However, developers may implement some of them, some may be implemented by non-core applications (i.e., waveforms, etc.), and some may be implemented by hardware device providers.

For purposes of description only, a brief description of an example of a communications system that would benefit from the present invention is described relative to a non-limiting example shown in FIG. 18. This high-level block diagram of a communications system includes a base station segment 152 and wireless message terminals that could be modified for use with the present invention. The base station segment 152 includes a VHF radio 160 and HF radio 162 that communicate and transmit voice or data over a wireless link to a VHF net 164 or HF net 166, each which include a number of respective VHF radios 168 and HF radios 170, and personal computer workstations 172 connected to the radios 168,170. Ad-hoc communication networks 173 are interoperative with the various components as illustrated. Thus, it should be understood that the HF or VHF networks include HF and VHF net segments that are infrastructure-less and operative as the ad-hoc communications network. Although UHF radios and net segments are not illustrated, these could be included.

The HF radio can include a demodulator circuit 162a and appropriate convolutional encoder circuit 162b, block interleaver 162c, data randomizer circuit 162d, data and framing circuit 162e, modulation circuit 162f, matched filter circuit 162g, block or symbol equalizer circuit 162h with an appropriate clamping device, deinterleaver and decoder circuit 162i modem 162j, and power adaptation circuit 162k as non-limiting examples. A vocoder circuit 162l can incorporate the decode and encode functions and a conversion unit which could be a combination of the various circuits as described or a separate circuit. A transmit key switch 162m is operative as explained above. These and other circuits operate to perform any functions necessary for the present invention, as well as other functions suggested by those skilled in the art. The circuits referenced here may include any combination of software and/or hardware elements, including but not limited to general purpose microprocessors and associated software, specialized microprocessors for digital signal processing and their associated software, Application Specific Integrated Circuits (ASICs), Field Programmable Gate Arrays (FPGAs), logic circuits, or other kinds of devices and/or software or firmware known to those skilled in the art. Other illustrated radios, including all VHF mobile radios and transmitting and receiving stations can have similar functional circuits.

The base station segment 152 includes a landline connection to a public switched telephone network (PSTN) 180, which connects to a PABX 182. A satellite interface 184, such as a satellite ground station, connects to the PABX 182, which connects to processors forming wireless gateways 186a, 186b. These interconnect to the VHF radio 160 or HF radio 162, respectively. The processors are connected through a local area network to the PABX 182 and e-mail clients 190. The radios include appropriate signal generators and modulators. The non-packetized digital voice information transmitted within the network using the techniques of the present invention can originate at or be delivered to a handset connected to one of the radios, a telephone or other interface device attached to a wireless gateway device such as the RF-6010 Tactical Network Hub, or a subscriber telephone connected to the PABX or within the public switched telephone network.

An Ethernet/TCP-IP local area network could operate as a "radio" mail server. E-mail messages could be sent over radio links and local air networks using STANAG-5066 as second-generation protocols/waveforms, the disclosure which is hereby incorporated by reference in its entirety and, of course, preferably with the third-generation interoperability standard: STANAG-4538, the disclosure which is hereby incorporated by reference in its entirety. An interoperability standard FED-STD-1052, the disclosure which is hereby incorporated by reference in its entirety, could be used with legacy wireless devices. Examples of equipment that can be used in the present invention include different wireless gateway and radios manufactured by Harris Corporation of Melbourne, Fla. This equipment could include RF5800, 5022, 7210, 5710, 6010, 5285 and PRC 117 and 138 series equipment and devices as non-limiting examples.

These systems can be operable with RF-5710A high-frequency (HF) modems and with the NATO standard known as STANAG 4539, the disclosure which is hereby incorporated by reference in its entirety, which provides for transmission of long distance HF radio circuits at rates up to 9,600 bps. In addition to modem technology, those systems can use wireless email products that use a suite of data-link protocols designed and perfected for stressed tactical channels, such as the STANAG 4538 or STANAG 5066, the disclosures which are hereby incorporated by reference in their entirety. It is also possible to use a fixed, non-adaptive data rate as high as 19,200 bps with a radio set to ISB mode and an HF modem set to a fixed data rate. It is possible to use code combining techniques and ARQ.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications system, comprising:
a plurality of nodes forming a wireless mesh network; and
a plurality of wireless communication links connecting the nodes together;
each node comprising a communications device having a physical layer (PHY) and a media access control (MAC) layer in accordance with the Open System Interconnect (OSI) model and operative for transmitting and receiving communications packets wirelessly to and from other nodes via the wireless communications links in an automatic repeat request (ARQ) mode,
wherein said physical layer comprises:
  a channel monitoring circuit configured to monitor channel parameters of the wireless communications link when in an ARQ mode; and
  a processor configured to receive and process the monitored channel parameters and estimate values for over-the-air (OTA) parameters comprising bandwidth, data rate, transmit power, block size, burst length, waveform, modulation type, the symbol rate, and error correction code scheme for the wireless communications link,
  wherein said processor is configured to:
    communicate to the MAC layer the estimated values for the OTA parameters for transmitting packets;
    establish the wireless communications link with the estimated OTA parameters; and
    determine which OTA parameters are to be changed to establish a new wireless communications link with new estimated OTA parameters when monitored channel parameters change.

2. The communications system according to claim 1, wherein said channel parameters comprise one of at least multipath, fading, signal-to-noise ratio, received signal strength (RSS), bit error rate, packet error rate and interference level.

3. The communications system according to claim 1, wherein said MAC layer includes an ARQ circuit that adds ARQ headers to communications packets at the communications device.

4. The communications system according to claim 1, wherein said MAC layer includes an ARQ circuit that provides a positive and/or negative acknowledgment based on received communications packets.

5. The communications system according to claim 1, wherein said MAC or PHY layer includes a forward error correction (FEC) encoder that encodes communications packets generated at the communications device with a forward error correction code.

6. The communications system according to claim 1, wherein said MAC or PHY layer includes a FEC decoder that decodes received packets.

7. The communications system according to claim 1, wherein said channel monitoring circuit and processor implements an interface to the MAC layer for communicating to the MAC the OTA parameters.

8. An apparatus comprising:
a wireless transceiver comprising a physical layer (PHY) and a media access control (MAC) layer in accordance with the Open System Interconnect (OSI) model and operative for transmitting and receiving communications packets wirelessly to and from other transceivers over a wireless communications link in an automatic repeat request (ARQ) mode;
a channel monitoring circuit at the physical layer that monitors channel parameters of a wireless communications link over which the wireless transceiver communicates packets when in an ARQ mode; and
a processor at the physical layer that receives and processes the monitored channel parameters from the monitoring circuit and configured to select values for estimated over-the-air (OTA) parameters comprising bandwidth, data rate, transmit power, block size, burst length, waveform, modulation type, the symbol rate, and error correction code scheme for the wireless communications link, wherein said processor is configured to:
communicate to the MAC layer the estimated values for the OTA parameters used for transmitting communications packets;
establish the wireless communications link with the estimated OTA parameters; and
determine which OTA parameters are to be changed to establish a new wireless communications link with new estimated OTA parameters when monitored channel parameters change.

9. The apparatus according to claim 8, wherein said channel parameters comprise one of at least multipath, fading, signal-to-noise ratio, received signal strength (RSS), bit error rate, packet error rate, and interference level.

10. The apparatus according to claim 8, wherein said MAC layer includes an ARQ circuit that adds ARQ headers to communication packets at the communications device.

11. The apparatus according to claim 8, wherein said MAC layer includes an ARQ circuit that provides a positive and/or negative acknowledgment based on received communications packets.

12. The apparatus according to claim 8, wherein said MAC or PHY layer includes a forward error correction (FEC) encoder that adds a FEC code to data packets generated at the communications device.

13. The apparatus according to claim 8, wherein said MAC or PHY layer includes a FEC decoder that decodes received packets.

14. A method for communicating, comprising:
transmitting a communications packet wirelessly from a transceiver to a destination node using an automatic repeat request (ARQ) protocol, wherein the transceiver includes a physical layer and a media access control (MAC) layer;
monitoring channel parameters from the physical layer at the communications channel that exists between the transceiver and destination node when the transceiver is in an ARQ mode;
receiving and processing the monitored channel parameters within a processor and estimating values for over-the-air (OTA) parameters comprising bandwidth, data rate, transmit power, block size, burst length, waveform, modulation type, the symbol rate, and error correction code scheme for the wireless communication link;
communicating the estimated values for the OTA parameters, from the physical layer to MAC layer;
establishing the wireless communications link with the estimated OTA parameters; and
estimating new OTA parameters and establishing a new wireless communications link with the new estimated OTA parameters when the monitored channel parameters change.

15. A method according to claim 14, which further comprises monitoring channel parameters that comprise one of at least multipath, fading, signal-to-noise ratio, received signal strength (RSS), bit error rate, packet error rate and interference level.

16. A method according to claim 14, which further comprises adding ARQ headers to communications packets that are transmitted from the transceiver.

17. A method according to claim 14, which further comprises encoding communications packets with a forward error correction (FEC) code.

* * * * *